(12) United States Patent
Cameron et al.

(10) Patent No.: US 8,095,770 B2
(45) Date of Patent: Jan. 10, 2012

(54) METHOD AND SYSTEM FOR MAPPING DATA TO A PROCESS

(75) Inventors: George R. Cameron, Santa Cruz, CA (US); Blake A. Jones, Oakland, CA (US); Stan J. Studzinski, Mountain View, CA (US)

(73) Assignee: Oracle America Inc., Redwood City, CA (US)

( * ) Notice: Subject to any disclaimer, the term of this patent is extended or adjusted under 35 U.S.C. 154(b) by 393 days.

(21) Appl. No.: 12/437,683

(22) Filed: May 8, 2009

(65) Prior Publication Data

US 2010/0287347 A1    Nov. 11, 2010

(51) Int. Cl.
G06F 12/00    (2006.01)
(52) U.S. Cl. ......................... 711/202; 711/206
(58) Field of Classification Search .................. 711/202, 711/206
See application file for complete search history.

(56) References Cited

U.S. PATENT DOCUMENTS 4,812,981 A * 3/1989 Chan et al. .................... 711/202

OTHER PUBLICATIONS

Moran, Joseph P., Sun Microsystems, Inc., In Proceedings of the Spring 1988 European UNIX Users Group Conference, "SunOS Virtual Memory Implementation", Mountain View, California, Apr. 11-15, 1988, the Queen Elizabeth Conference Centre, London; pp. 1-17.
Gingell, Robert A., Moran, Joseph P., Shannon, William A.; Sun Microsystems, Inc.; in Proceedings of USENIX Summer Conference, "Virtual Memory Architecture in SunOS", Mountain View, California; Phoenix, AR, USA, Jun. 1987, pp. 1-14.

* cited by examiner

*Primary Examiner* — Michael Tran
(74) *Attorney, Agent, or Firm* — Osha • Liang LLP (57) ABSTRACT

The invention relates to mapping data to a process. A method of the invention includes receiving a request to copy a parent process, where the parent process is associated with a first virtual memory address space that includes a first mapping to a page of a file loaded into physical memory. The method includes creating a child process (of the parent process) associated with a second virtual memory address space. The method includes determining that a fork count is greater than a fork count threshold and a COW count to fork count ratio is greater than a threshold ratio. The fork count is associated with the file and the COW count is associated with the page. The method includes creating a copy of the page in physical memory and further includes creating a second mapping from the second virtual memory address space to the copy of the page.

20 Claims, 12 Drawing Sheets

METHOD AND SYSTEM FOR MAPPING DATA TO A PROCESS

BACKGROUND

A process executes a set of instructions. Executable instructions are stored in files on a storage disk. Before a process executes, its executable instructions must be loaded from a file into physical memory. Files are typically organized into any number of uniformly-sized logical divisions called pages. Hence, a page constitutes the indivisible unit of manageable data managed by a memory management unit.

Because physical memory has historically been a limited resource, the concept of virtual memory is used to extend physical memory by way of strategic use of storage disks. For example, a primary effect of virtual memory is the notion of presenting an executing process or application with a contiguous virtual memory address space when in fact it is physically fragmented in physical memory and perhaps on a storage disk. In instances when the memory need for a process does in fact overflow from physical memory onto storage disks, one consideration is determining whether a particular page should be maintained in physical memory or on a storage disk. Because physical memory exhibits a more favorable access time than a storage disk, a virtual memory scheme may maintain more frequently accessed pages in physical memory. As such, the storage disk can be thought of as a backing store for physical memory because it also acts to maintain the less frequently-accessed pages of a process.

In view of this fragmented aspect of physical addressing, memory management for an executing process is frequently managed using a granularity of a page of data. For example, the virtual memory address space for a particular process may exhibit a number of mappings to the pages loaded in physical memory that are relevant to the execution of the process. Each mapping is associated with an access privilege. For example, a read-only access privilege only permits the process to read from but not modify the mapped page. On the other hand, a read-write access privilege permits the process to both read from and modify the mapped page.

Page-scale granularity has been crucial in the development of process creation routines. Traditionally, when a new process is created, a "fork" operation makes a copy of a currently executing parent process. As a result, copies of pages privately mapped to by the parent process are then duplicated in physical memory for mapping to by the newly-created child process.

The copy-on-write (COW) procedure was then developed as a solution to bypass the intensive page copy creation involved in the traditional "fork" operation. Instead of creating a new set of identical pages, the COW procedure merely maps to the existing pages from the virtual memory address space of the child process. In a sense, the parent and child processes are now sharing pages. Further, the processing required to create per-page copies of what the parent process maps to is not wasted if the newly-created child process subsequently executes a new and different program that requires a new set of pages to be loaded into physical memory.

Because pages are effectively shared between processes after a copy-on-write procedure, the mappings from both the parent and child process virtual memory address spaces to the commonly-shared pages in physical memory are defined by read-only access privileges. As such, measures are taken when either the parent or child process attempts to write to a shared page. At the outset, if the parent has a read-write access privilege, then the private mapping from the parent's virtual memory address space must have that read-write access privilege removed, which requires a communication with each processor in the computer system. Further, to remedy the issue of data ownership in light of an attempt to write to data that was until this point effectively shared, a copy of the page is created. Because the copy of the page is intended to be write-eligible, the copy of the page is then privately mapped with a read-write access privilege to the virtual memory address space of the writing process.

SUMMARY

In general, in one aspect, the invention relates to a method for mapping data to a process. The method includes receiving a request to copy a parent process. The parent process is associated with a first virtual memory address space which includes a first mapping to a page of a file loaded into physical memory. The method further includes creating, in response to the request, a child process of the parent process, where the child process is associated with a second virtual memory address space. The method further includes determining that a fork count is greater than a defined fork count threshold and a COW count to fork count ratio is greater than a defined threshold ratio. The fork count is associated with the file and the COW count is associated with the page. The method further includes creating, in response to the determination, a copy of the page in physical memory. The method further includes creating a second mapping from the second virtual memory address space to the copy of the page in physical memory.

In general, in one aspect, the invention relates to a computer usable storage medium having computer readable program code embodied therein, when executed by a processor, to implement a method comprising: receiving a request to copy a parent process, where the parent process is associated with a first virtual memory address space and includes a first mapping to a page of a file loaded into physical memory, and where a fork count is associated with the file and a copy-on-write (COW) count is associated with the page; creating a child process during a fork operation performed using the parent process, where the child process is associated with a second virtual memory address space; incrementing a fork count associated with the file in response to the fork operation; determining that a value of the fork count is greater than a defined fork count threshold; calculating a ratio of a value of the COW count to the value of the fork count; determining that the ratio is greater than a threshold ratio associated with the page; creating a copy of the page in physical memory; and creating a mapping from the second virtual memory address space of the child process to the copy of the page.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for mapping data to a process. More specifically, embodiments of the invention are directed to privately mapping data stored in physical memory to the address space of a newly-created process. In particular, embodiments of the invention make a "COW-ahead" prediction on a per-page basis that determines whether the newly-created process is likely to write to the page of data. On that basis, embodiments of the invention may give the newly-created process its own exclusive copy of the data.

Figures 1A, 1B:
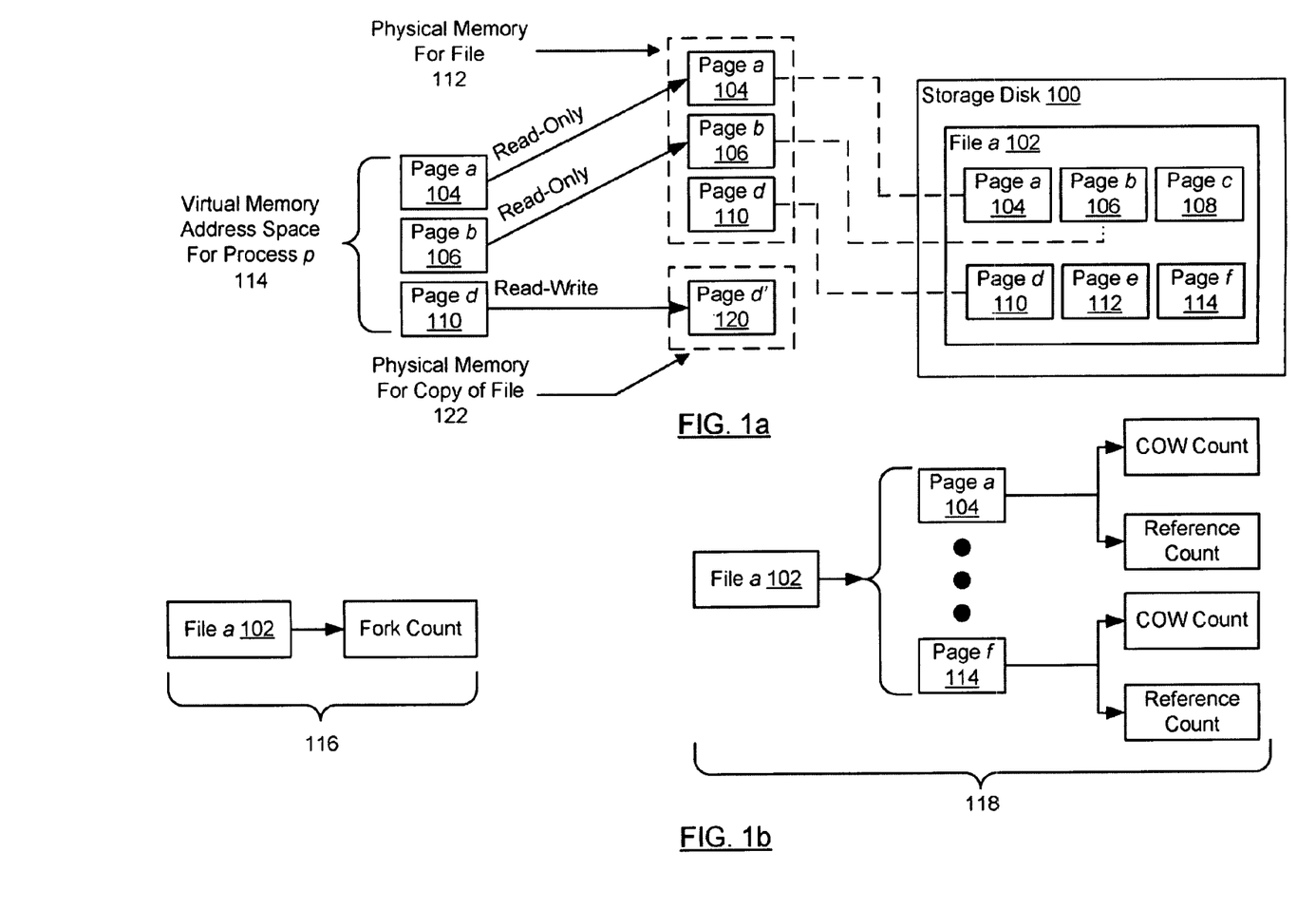
FIG. 1a shows a system in accordance with one or more embodiments of the invention.
FIG. 1b shows metadata maintained in accordance with one or more embodiments of the invention.

FIG. 1a shows a system in accordance with one or more embodiments of the invention. Specifically, FIG. 1a shows a storage disk (100), physical memory (112), and a virtual memory address space for a process (114). Each of these components is described below.

In one or more embodiments of the invention, an executing process is associated with a virtual memory address space (114). For a process to execute upon a set of instructions or upon a set of data, the content must be accessible to the process. Accordingly, in one or more embodiments of the invention, the content (104-114) may be organized into pages which are selectively loaded into physical memory (112) as needed by the process for its execution.

In one or more embodiments of the invention, a page corresponds with a file stored using a file system. A page from a file stored in a file system may maintain, for example, executable instructions, definitions, or defined constants. Alternatively, in one or more embodiments of the invention, the page may correspond with data maintained in anonymous memory stored by way of, for example, a process stack or heap.

In one or more embodiments of the invention, a set of mappings defines the access privileges pertaining to the process executing in a virtual memory address space (114) in relation to the pages (104, 106, 110) loaded in physical memory (112). As shown in FIG. 1a, these access privileges may be defined as read-only or read-write.

In one or more embodiments of the invention, the storage disk (100) is configured to store one or more pages (108, 112) that have been swapped out of physical memory (112) when a process requires a different page for purposes of its execution. As such, the storage disk (100) may be configured to function as a backing store for the physical memory in that when those swapped-out pages (108, 112) are needed at a later time by the process they are readily available for loading into physical memory (112).

FIG. 1b shows metadata maintained in accordance with one or more embodiments of the invention. FIGS. 3a through 3h provide a working example demonstrating how the metadata described below is maintained according to one or more embodiments of the invention.

Turning to element 116 of FIG. 1b, a fork count may be maintained for each file in accordance with one or more embodiments of the invention. Accordingly, a fork count for a particular file may be incremented when a process which is mapped to one or more pages associated with that particular file is subject to a "fork" operation.

Turning to element 118 of FIG. 1b, a COW count and a reference count are maintained for each page associated with a file in accordance with one or more embodiments of the invention. The COW count is maintained per logical page. As such, the COW count for a particular page may be incremented when a parent process which maps to that page is used in a "fork" operation to create a child process and then either the parent or child process attempts to write to the page. The reference count is maintained per physical page. As such, the reference count for a particular page may be incremented or decremented in accordance to how many processes are presently mapping to the particular page.

Figure 2A:
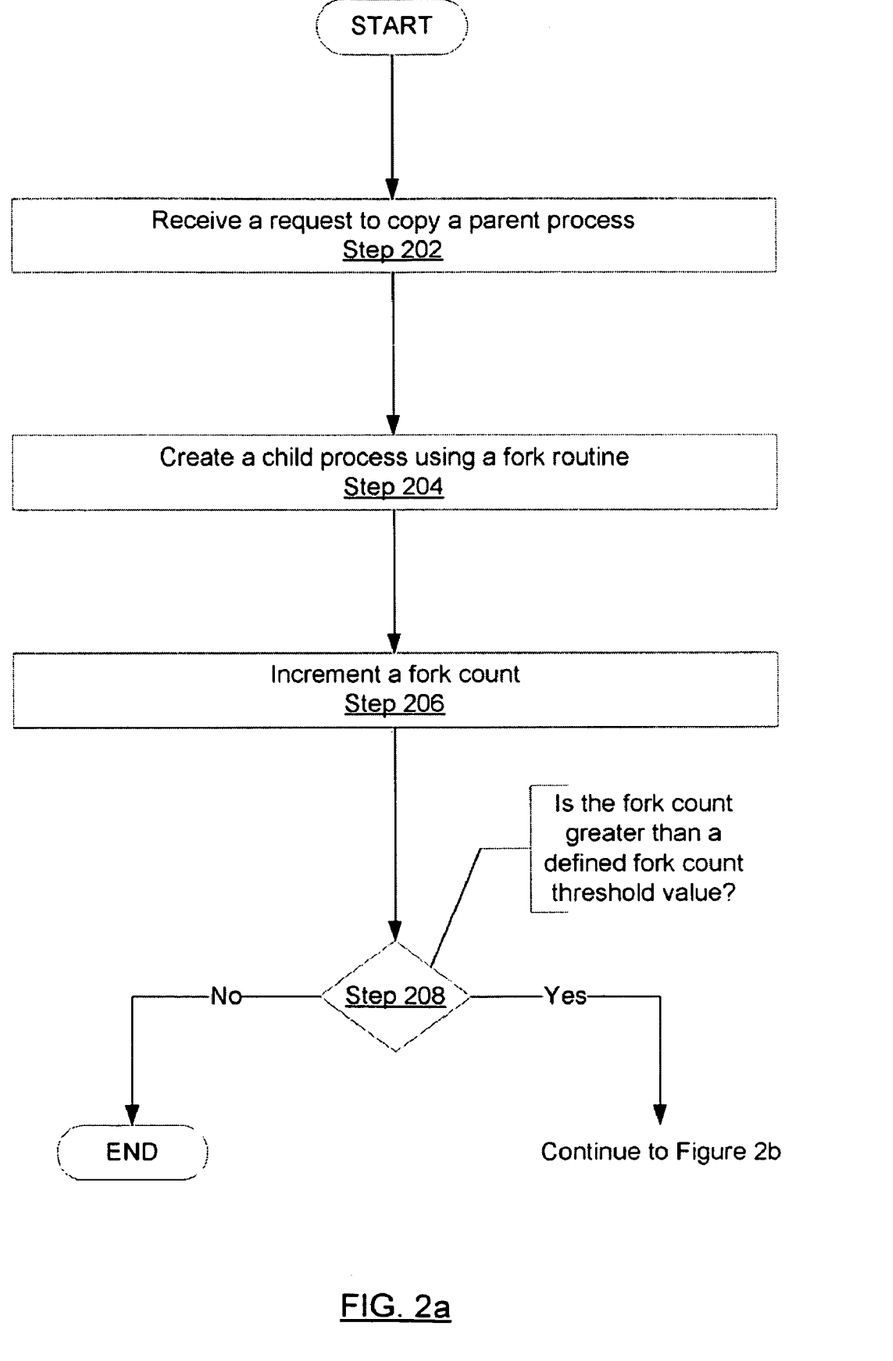
FIGS. 2a and 2b show a flowchart in accordance with one or more embodiments of the invention.
Figure 2B:
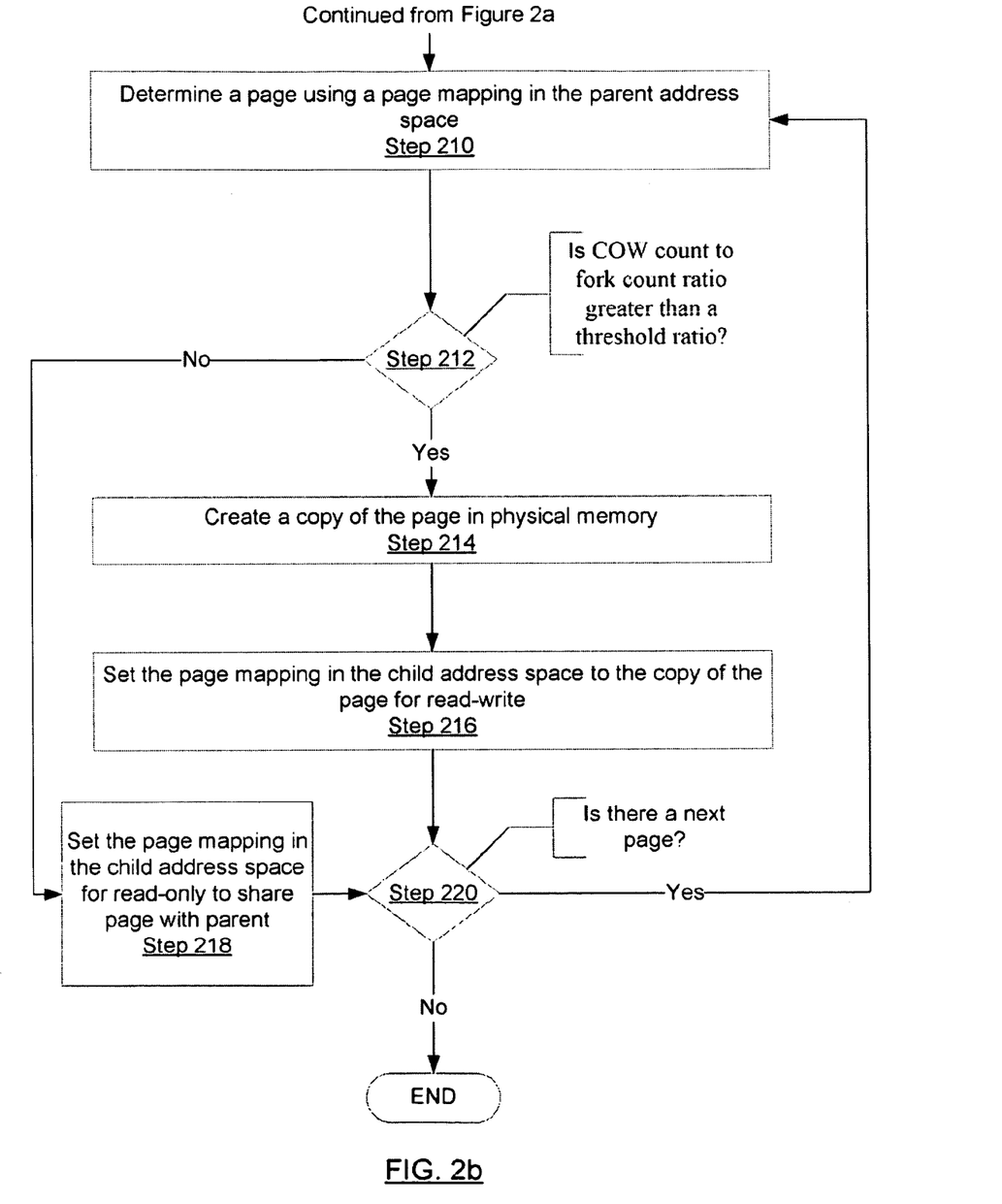

FIGS. 2a and 2b show a flowchart in accordance with one or more embodiments of the invention. The process shown in FIGS. 2a and 2b may be used, for example, to map data to a process. Specifically, the process shown in FIGS. 2a and 2b determine whether the created child process includes mappings to any pages which are likely to be the subject of a COW operation.

While the various steps in FIG. 2 are presented and described sequentially, one should appreciate that some or all of the steps may be executed in different orders, may be combined or omitted, and some or all of the steps may be executed in parallel. In addition, steps have been omitted to simplify the presentation.

In Step 202, a request is received to copy a parent process where the parent process is mapped to one or more pages that are presently loaded in physical memory. Requests may be generated, for example, when a web server receives a connection request or a user enters a command at a command prompt.

In Step 204, a "fork" operation is performed using the parent process to create a child process. The parent process and the child process may be both mapped to the same set of pages loaded in physical memory. As such, the private mappings from both parent and child processes are subject to read-only privilege.

In Step 206, a fork count is incremented for the files associated with the mapped-to pages loaded in physical memory. Likewise, and not shown in either FIG. 2a or FIG. 2b, a reference count may be incremented for each mapped-to page due to the newly-formed mappings from the virtual memory address space of the child process.

In Step 208, a determination is made as to whether the fork count for the file is greater than a defined fork count threshold value. In one or more embodiments of the invention, the defined fork count threshold value may be a constant. In one or more embodiments of the invention, the defined fork count threshold may be set so that a constant percentage of mapped files have fork counts above the defined fork count threshold value.

If the fork count is greater than the defined fork count threshold value, then Step 210 is executed. Otherwise, if the fork count is not greater than the defined fork count threshold value, no further steps are preformed as the child process does not include any mappings to pages that are eligible for a "COW-ahead prediction."

Steps 210 through 220 provide for an iterative search that examines each page that is mapped to by the newly created child process for purposes of predicting whether a COW procedure is likely to happen as a result of an attempted write by the child process. Specifically, in Step 210, a first page is selected for examination.

In Step 212, the COW count to fork count ratio for the selected page is compared against a threshold ratio to determine whether a COW procedure is likely to happen as a result of an attempted write by the child process. If the calculated ratio for the page is greater than the threshold ratio, then Step 214 is executed next.

Alternatively, if the ratio for the page is not greater than the threshold ratio, a traditional COW procedure is preformed for the page in Step 218 where both the pages have read-only access privileges to the common page. Subsequently, Step 220 is executed to determine whether a next page requires evaluation.

In Step 214, a copy of the selected page is created and stored in physical memory in addition to the original copy of the selected page. In Step 216, the mapping from the child process to the selected page is redirected to the newly-created copy of the selected page (of Step 214). Further, the mapping is defined with a read-write access privilege. In one embodiment of the invention Step 214 may also include updating the corresponding metadata associated with the file (see e.g., FIG. 1b). For example, creation of a page at minimum requires tracking of a reference count for the created page.

In Step 220, a determination is made about whether there is a next page that requires examination. If a next page requires examination, Step 210 is performed to select the next page. Otherwise, if no further pages require examination, then no further steps are performed.

In one or more embodiments of the invention, a per-page flag is maintained such that the flag is set for a page once (i) the fork count for the file associated with that page is sufficiently high (i.e., reached the defined fork count threshold value) and (ii) the page has already been determined as a "COW-ahead" candidate. As such, by maintaining this per-page flag, it would be possible to skip the determination of Step 212 in cases where a particular page met the aforementioned criteria.

FIGS. 3a through 3h show a system in accordance with one or more embodiments of the invention. For purposes of this example, assume that the defined fork count threshold is 3 for the file to which the depicted pages belong (hereinafter called File a, [not shown]). Further assume that the defined COW count to fork count threshold ratio is 33%.

Figure 3A:
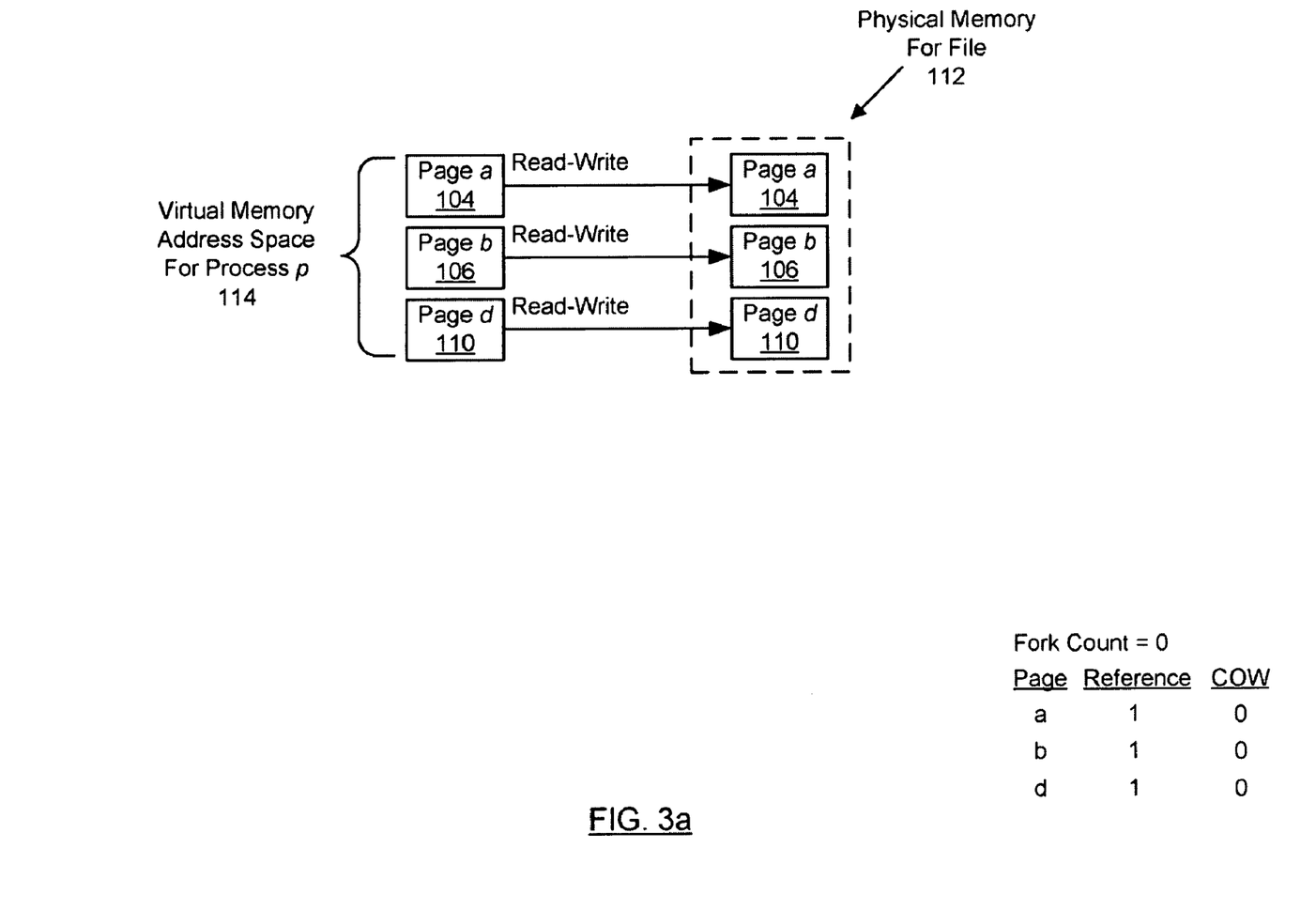
FIGS. 3a through 3h show a system in accordance with one or more embodiments of the invention.

As with FIG. 1a, FIG. 3a shows a virtual memory address space for a process (114) and physical memory (112). Specifically, Process p (114) maps to Page a (104), Page b (106), and Page d (110) which are loaded in physical memory (112). For purposes of beginning this example, assume that Process p (114) is the only process that is presently mapping to those pages (104, 106, 110) loaded in physical memory (112). As such, there are two logical implications: (i) the three mappings from the virtual memory address space of Process p (114) to the pages (104, 106, 110) loaded in physical memory are all defined by a read-write access privilege because the pages are not shared; and (ii) because the pages are not shared, the reference count for each of the pages is presently 1. In addition, because no copy-on-write operations (COW) have been performed, the COW count for each page is 0. Further, because no child process has been created by way of a "fork" operation, the fork count is also presently 0 for File a.

Figure 3B:
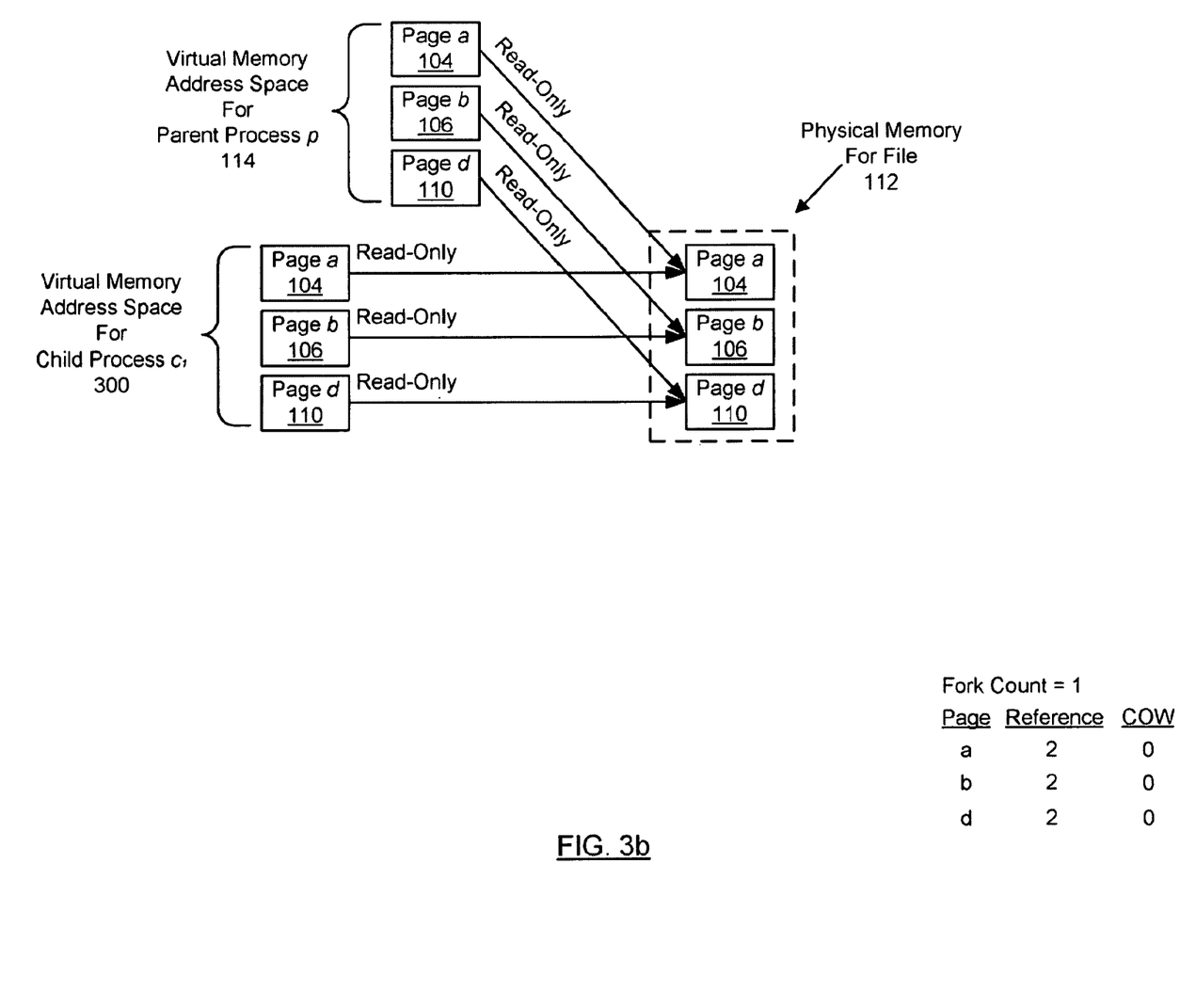

In FIG. 3b, a "fork" operation is performed using Process p (114) to create Process $c_1$ (300). As a result, the fork count is incremented to 1 for File a. Further, because of the "fork" operation, both Process p (114) and Process $c_1$ (300) are mapped to the same pages (104, 106, 110). Accordingly, the reference count for each of these pages (104, 106, 110) is incremented to 2. Similarly, because the pages (104, 106, 110) are shared amongst multiple processes (114, 300), read-only access privileges are used for each of the mappings from the respective processes (114, 300) to the shared pages (104, 106, 110) in physical memory (112).

Because the fork count (i.e., =1) is not greater than the fork count threshold, there is no examination of the mapped-to pages to determine whether any of them are eligible for a "COW-ahead" operation. This scenario corresponds to the execution of Step 208 and its subsequent "No" branch as shown in FIG. 2a.

Figure 3C:
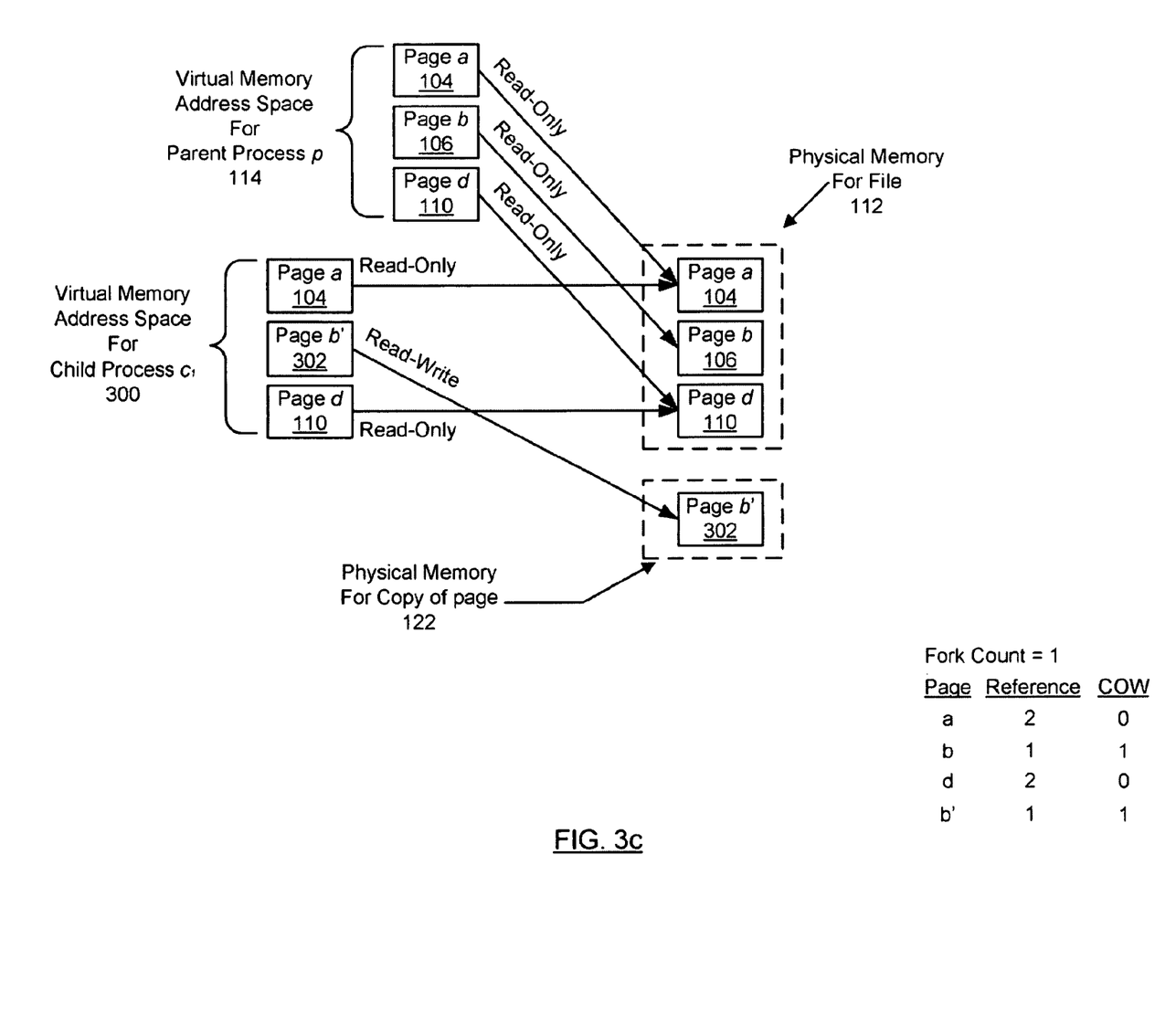

In FIG. 3c, Process $c_1$ (300) attempts to write to Page b (106). Because Page b (106) is presently mapped to by both Process p (114) and Process $c_1$ (300), a new copy of the page—Page b' (302)—is created so that Process $c_1$ (300) may perform the write without affecting Process p (114). As such, FIG. 3c shows Page b' (302) which is effectively Process $c_1$'s private copy of the page which the process is free to modify. Accordingly, the mapping from Process $c_1$ (300) to Page b' (302) which is backed by corresponding physical memory (122) has a read-write access privilege, whereas the mapping from Process p (114) to Page b (106) still has a read-only access privilege.

Because of the copy-on-write that resulted from Process $c_1$'s attempt to write to Page b (106), the COW count is incremented for Page b (106). Because Page b (106) and Page b' (302) correspond to versions of the same page in File a, the COW count value for Page b (106) also pertains to Page b' (302). However, the reference count for Page b (106) is decremented to 1 because only Process p (114) presently maps to Page b (106). In addition, Page b' (302) assumes a reference count of 1 to reflect the mapping to the page from Process $c_1$ (300). The COW count and reference count values for the other pages (104, 110) remain unaffected because neither page was subject to any such changes in mapping or modification.

Figure 3D:
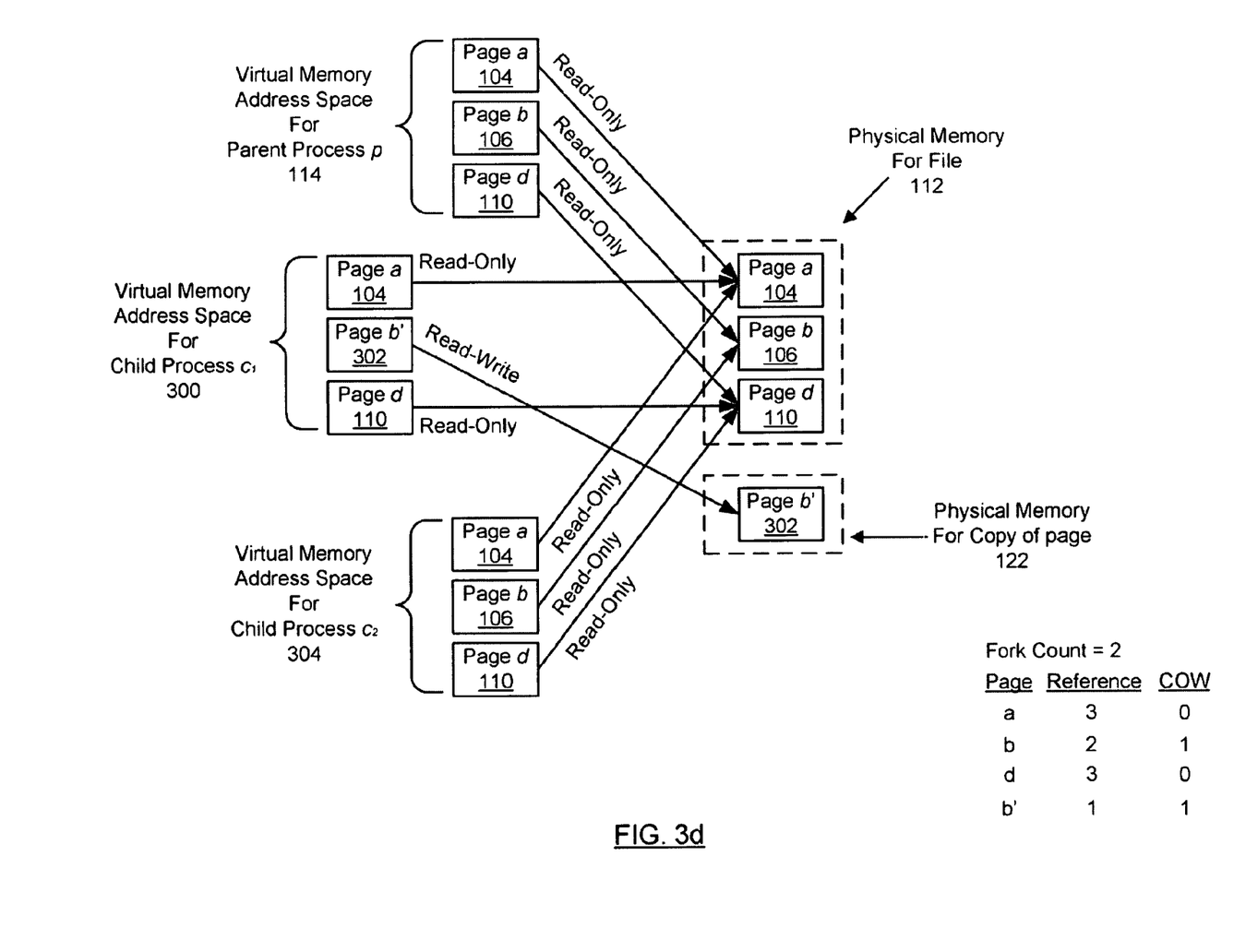

In FIG. 3d, a "fork" operation is performed using Process p (114) to create Process $c_2$ (304). As a result, the fork count is incremented to 2 for File a. Further, because of the "fork" operation, both Process p (114) and Process $c_2$ (304) are mapped to the same pages (104, 106, 110). Accordingly, the reference count for each of these pages (104, 106, 110) is incremented. Because pages are shared amongst Process p (114) and Process $c_2$ (304), the mappings from their virtual memory address spaces to the shared pages (104, 106, 110) are defined by read-only access privileges.

Because the fork count (i.e., =2) is not greater than the fork count threshold, there is no examination of the mapped-to pages to determine whether any of them are eligible for a "COW-ahead" operation. This mirrors the execution of Step 208 and its subsequent "No" branch as shown in FIG. 2a.

Figure 3E:
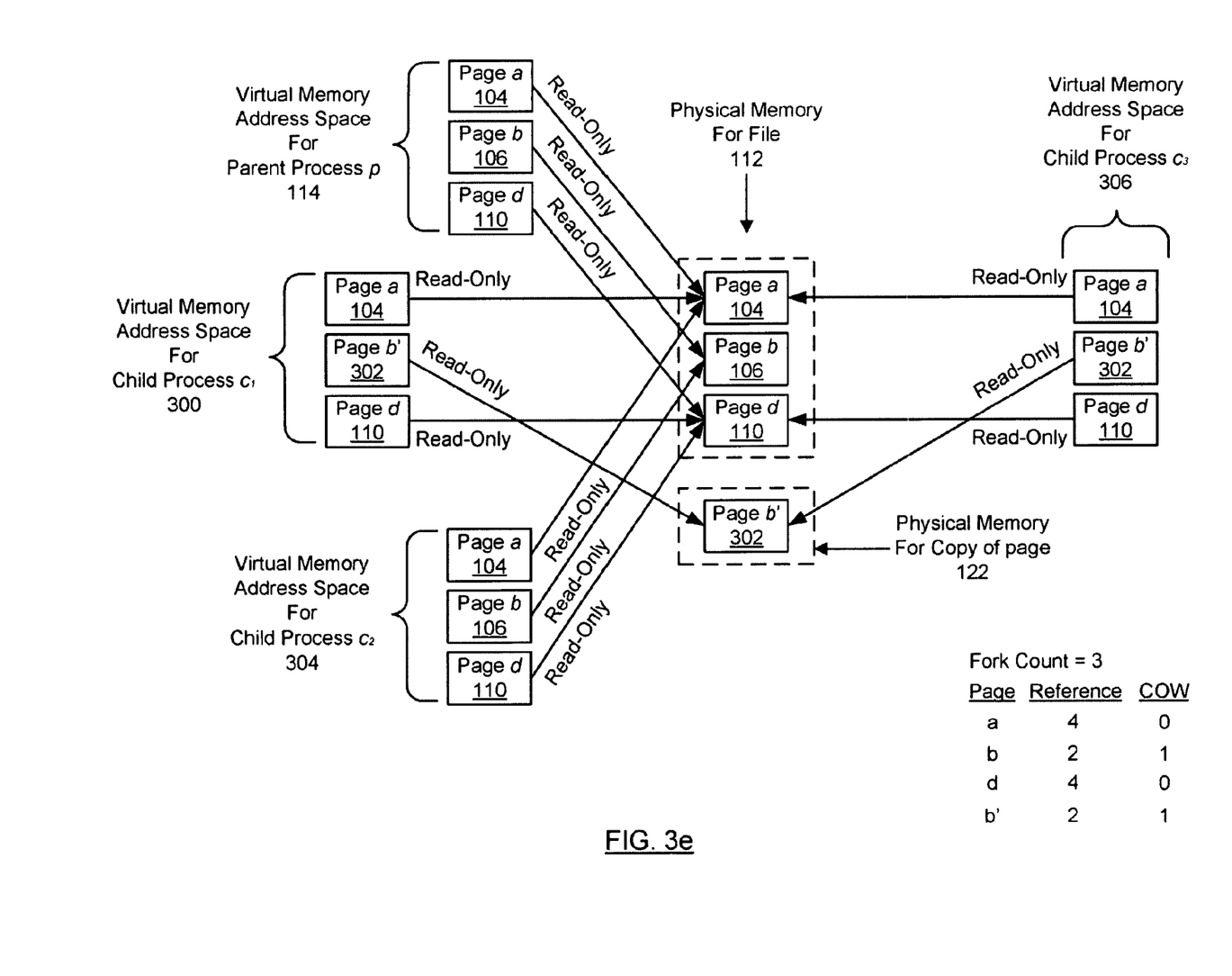

In FIG. 3e, a "fork" operation is performed using Process $c_1$ (300) to create Process $c_3$ (306). As a result, the fork count is incremented to 3 for File a. Further, because of the "fork" operation, both Process $c_1$ (300) and Process $c_3$ (306) are mapped to the same pages (104, 302, 110). Accordingly, the reference count for each of these pages (104, 302, 110) is incremented. Because pages are shared amongst Process $c_1$ (300) and Process $c_3$ (306), the mappings from their virtual memory address spaces to the shared pages (104, 302, 110) are defined by read-only access privileges.

Because the fork count (i.e., =3) is not greater than the fork count threshold, there is no examination of the mapped-to pages to determine whether any of them are eligible for a "COW-ahead" operation. This scenario corresponds to the execution of Step 208 and its subsequent "No" branch as shown in FIG. 2a.

Figure 3F:
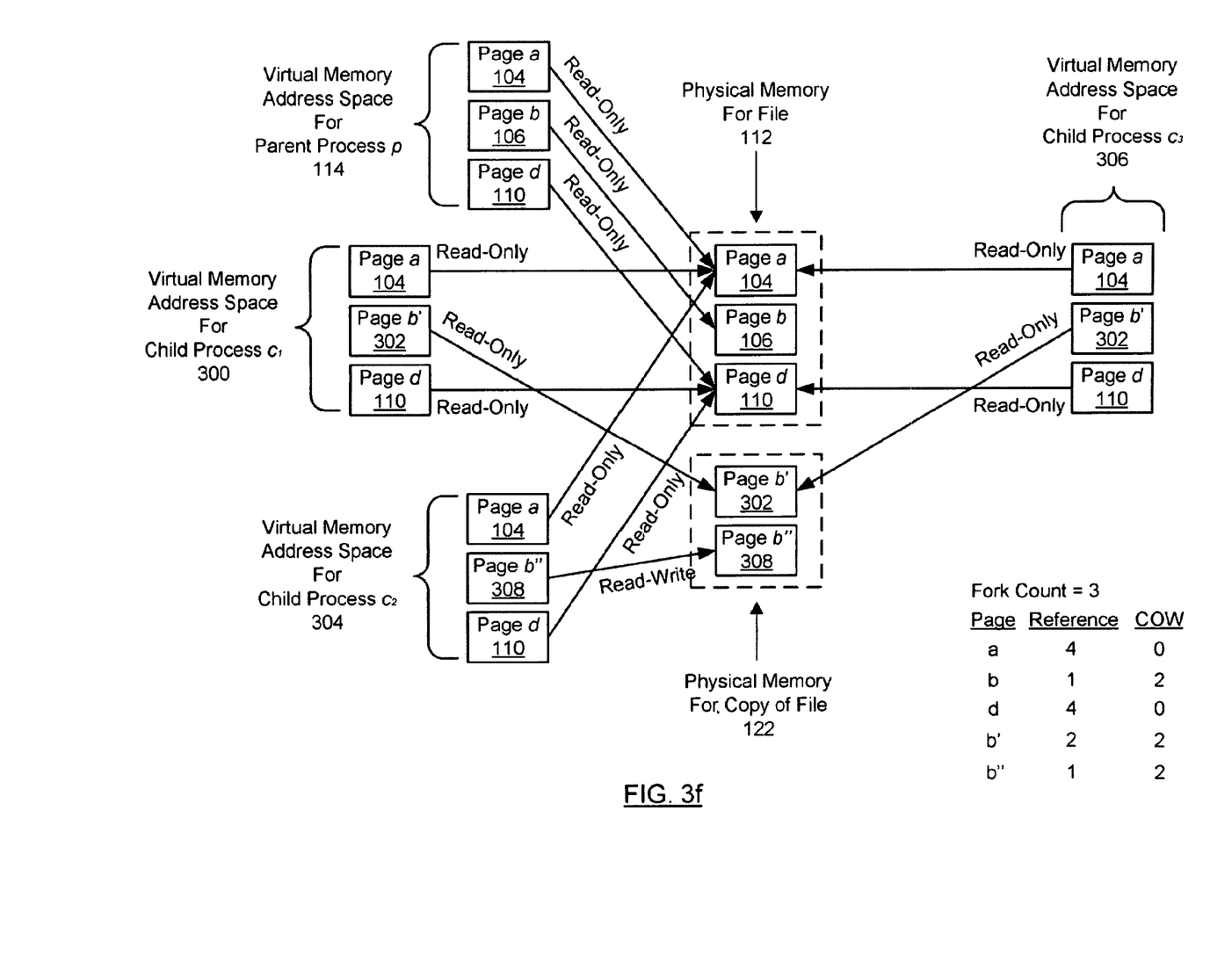

In FIG. 3f, Process $c_2$ (304) attempts to write to Page b (106). Because Page b (106) is presently mapped to by both Process p (114) and Process $c_2$ (304), a new copy of the page—Page b" (308)—is created so that Process $c_2$ (304) may perform the write without affecting Process p (114). As such, FIG. 3f shows Page b" (308) which is effectively Process $c_2$'s private copy of the page which the process is free to modify. Accordingly, the mapping from Process $c_2$ (304) to Page b" (308) which is backed by corresponding physical memory (122) has a read-write access privilege, whereas the mapping from Process p (114) to Page b (106) still has a read-only access privilege.

Because of the copy-on-write that resulted from Process $c_2$'s attempt to write to Page b (106), the COW count is incremented for Page b (106). Because Page b (106), Page b' (302), and Page b" (308) all correspond to versions of the same page in File a, the COW count value for Page b (106) also pertains to both Page b' (302) and Page b" (308). However, the reference count for Page b (106) is decremented to 1 because only Process p (114) presently maps to Page b (106). In addition, Page b" (308) assumes a reference count of 1 to reflect the mapping to the page from Process $c_2$ (304). The COW count and reference count values for other pages (104, 110) remain unaffected because they were not subject to any such changes in mapping or modification.

Figure 3G:
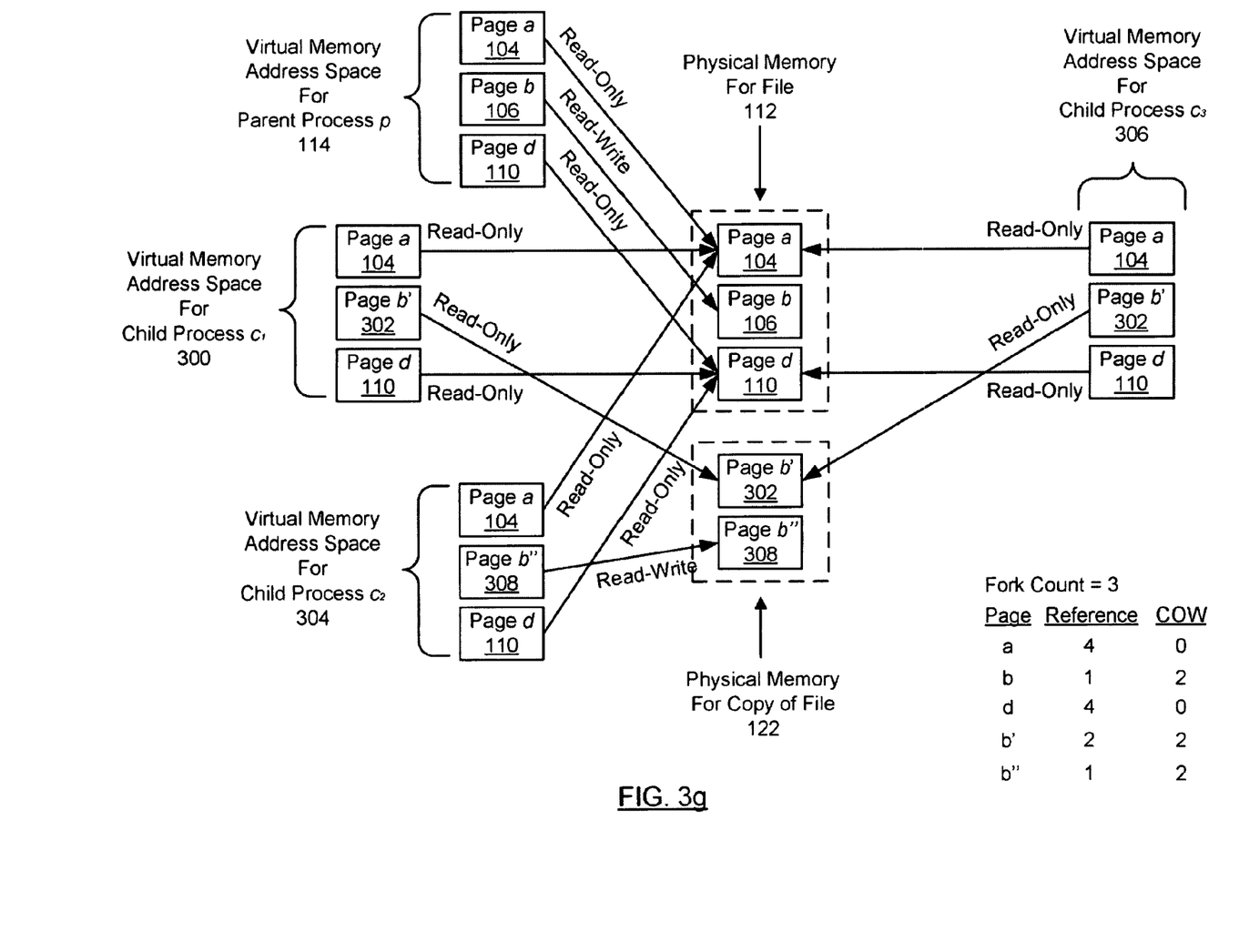

In FIG. 3g, Process p (114) attempts to write to Page b (106). Because Process p (114) is the only process that is mapped to the targeted page, the creation of a private copy is not required and the page in physical memory can be written to as is. However, as a result of the write, an operating system trap may be required to modify the access privilege from read-only to read-write before the actual write operation can be performed.

Figure 3H:
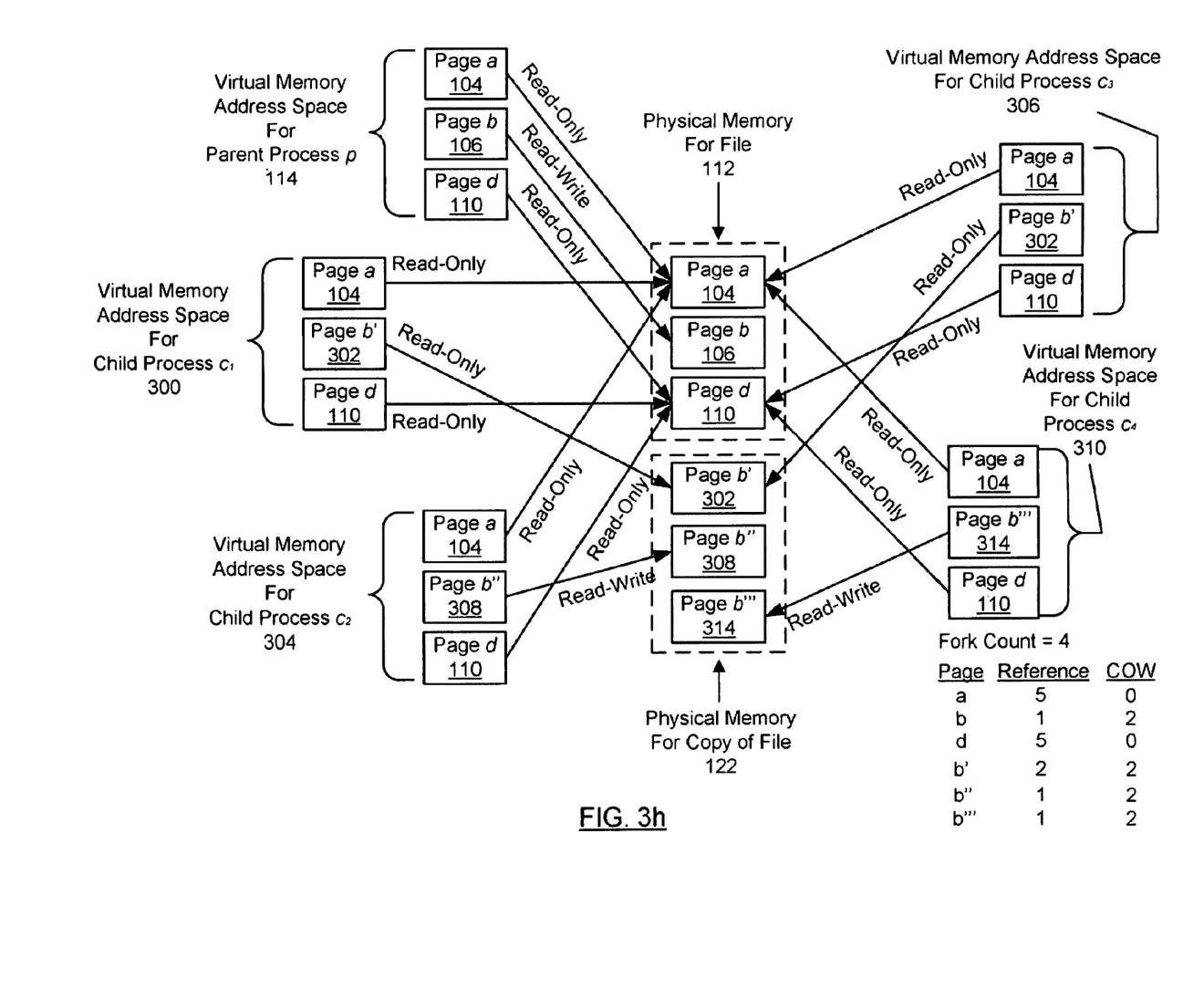

In FIG. 3h, a "fork" operation is been performed using Process p (114) to create Process $c_4$ (310). As a result, the fork count is incremented to 4 for File a. Further, because of the "fork" operation, both Process p (114) and Process $c_4$ (310) are at least initially mapped to the same pages (104, 106, 110).

However, because the fork count (i.e., =4) is now greater than the fork count threshold (i.e., =3), a page by page examination ensues of those pages (104, 106, 110) that are commonly mapped-to between Process p (114) and Process $c_4$ (310). This scenario corresponds to the execution of Step 208 and its subsequent "Yes" branch as shown in FIG. 2a and continuing in FIG. 2b.

Beginning with Page a (104), the COW count to fork count ratio is 0:4. Because this ratio does not exceed the defined ratio threshold of 33%, Page a (104) is not predicted as a likely candidate for "COW-ahead." The same holds true for Page d (110) as Page a (104).

Turning finally to Page b (106), the COW count to fork count ratio is 2:4. Because this ratio does exceed the defined ratio threshold of 33%, Page b (106) is predicted as a likely candidate for a "COW-ahead" operation. As a result, a new copy of Page b (106) is created and loaded into physical memory (122). This new copy is shown in FIG. 3h as Page b'" (314).

Accordingly, from this point forward when a "fork" operation is performed using a process that maps to Page b (106)—such as Process p (114), the mechanism of creating the new process takes into account that most newly-created processes have historically written to Page b (106). Based on this, the newly created processes are initially provided with their own private copy of Page b.

By giving newly-created processes private copies of the page to map to based on this predictive analysis, there is a reduction in overhead in comparison to what is typically required in the case of a traditional COW operation. For example, if the "COW-ahead" prediction did not take place, then a subsequent write attempt by Process $c_4$ (310) to Page b (106) would generate a trap to the operating system for purposes of copying the page and modifying the access privilege to the page for the process (as discussed above in reference Process p (114) in FIG. 3g). However, because the "COW-ahead" prediction gives Process $c_4$ (310) its own private copy with Page b'" (314), subsequent writes by Process $c_4$ (310) to Page b'" (314) do not require a copy or an access privilege modification. Accordingly, a trap to the operating system is not generated and there is no overhead cost incurred.

Further, the "COW-ahead" prediction spares Process p (114), which had an existing read-write access privilege to Page b (106), from requiring a modification to a read-only access privilege as would traditionally happen during a "fork" operation when a new process is created. As such, because Process $c_4$ (310) is privately mapped to its own page copy (i.e., Page b'" (314), Process p (114) can retain its read-write access privilege. Accordingly, the overhead cost of the operating system trap execution for at least that one access privilege modification is avoided. Further, after the "fork" operation, Process p (114) can write to Page b (106) as is because Process p (114) already has read-write access privilege. Accordingly, there is no required transition from a read-only access privilege to a read-write access privilege as would be required under a traditional COW scenario.

Figure 4:
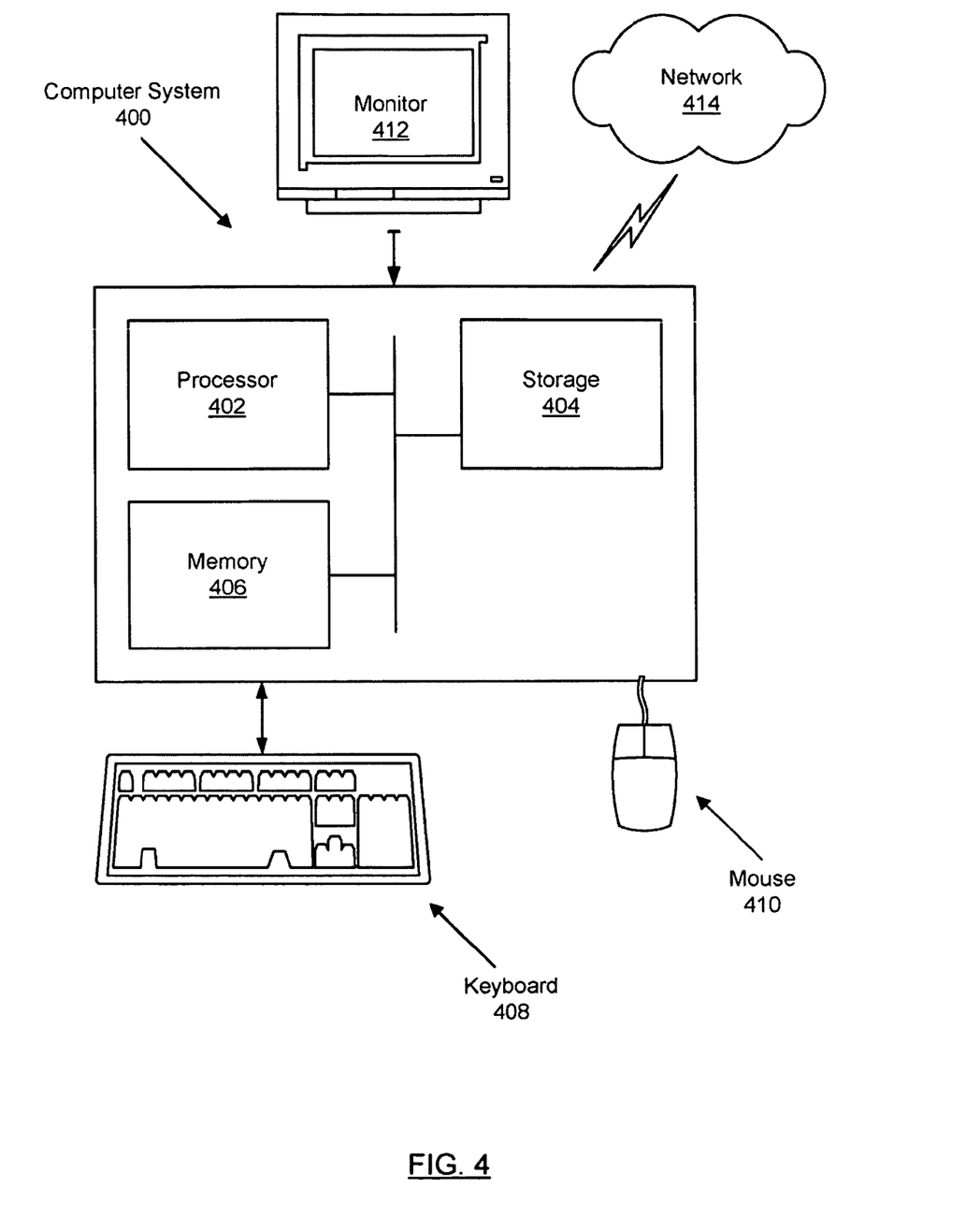
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processors (402), associated memory (406) (e.g., random access memory (RAM), cache memory, flash memory, etc.), a storage device (404) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping data to a process, comprising:
  receiving a first request to copy a first parent process, wherein the first parent process is associated with a first virtual memory address space, wherein the first virtual memory address space comprises a first mapping to a first page of a file loaded into physical memory and, wherein the first page is associated with a reference count and a copy-on-write (COW) count;
  creating a first child process during a first fork operation performed using the first parent process, wherein the first child process is associated with a second virtual memory address space, wherein the second virtual memory address space includes a second mapping to the first page;
  incrementing a first fork count associated with the file in response to the first fork operation; and
  incrementing the reference count associated with the first page in response to the first fork operation.

2. The method of claim 1, further comprising:
  receiving a second request to copy the first parent process;
  creating a second child process during a second fork operation performed using the first parent process, wherein the second child process is associated with a third virtual memory address space, wherein the third virtual memory address space includes a third mapping to the first page;
  incrementing the first fork count associated with the file in response to the second fork operation; and
  incrementing the reference count associated with the first page in response to the second fork operation.

3. The method of claim 2, further comprising:
  receiving a request from the second child process to modify the first page;
  creating a copy of the first page in response to the request from the second child process, wherein the copy of the first page is stored in the physical memory and the third virtual memory address space includes a fourth mapping to the copy of the first page;
  removing the third mapping from the third virtual address space;
  decrementing the reference count associated with the first page in response to creating the copy of the first page;
  incrementing a reference count associated with the copy of the first page; and
  incrementing the copy-on-write (COW) count associated with the first page.

4. The method of claim 3, further comprising:
  receiving a third request to copy the first parent process;
  creating a third child process during a third fork operation performed using the first parent process, wherein the third child process is associated with a fourth virtual memory address space;
  incrementing the first fork count associated with the file in response to the third fork operation;
  determining that a value of the first fork count is greater than a defined fork count threshold;
  calculating a ratio of a value of the COW count to the value of the first fork count;
  determining that the ratio is greater than a threshold ratio associated with the first page;
  creating a second copy of the first page in physical memory; and
  creating a fifth mapping from the fourth virtual memory address space of the third child process to the second copy of the first page.

5. The method of claim 4, wherein the third child process has read-write access to the second copy of the first page.

6. The method of claim 4, wherein access to the first page is read-only.

7. The method of claim 4, further comprising:
  receiving, after creating a second copy of the first page, a fourth request to copy the first parent process; and
  creating a fourth child process during a fourth fork operation performed using the first parent process, wherein the fourth child process is associated with a fifth virtual memory address space;
  creating a third copy of the first page in physical memory; and
  creating a sixth mapping from the fifth virtual memory address space of the fourth child process to the third copy of the first page.

8. A method for mapping data to a process, comprising:
  receiving a request to copy a parent process, wherein the parent process is associated with a first virtual memory address space, wherein the first virtual memory address space comprises a first mapping to a page of a file loaded into physical memory;
  creating, in response to the request, a child process of the parent process, wherein the child process is associated with a second virtual memory address space;
  determining that a fork count is greater than a defined fork count threshold and a COW count to fork count ratio is greater than a defined threshold ratio, wherein the fork count is associated with the file and the COW count is associated with the page;
  creating, in response to the determination, a copy of the page in physical memory; and
  creating a second mapping from the second virtual memory address space to the copy of the page in physical memory.

9. The method of claim 8, wherein the child process has read-write access to the copy of the page.

10. The method of claim 9, wherein the parent process has read-only access to the page when the reference count for the page is greater than one.

11. The method of claim 8, wherein the COW count for the page is incremented when the parent process that maps to the page is used in a fork operation to create the child process and there is a subsequent attempt to write to the page.

12. The method of claim 8, wherein the fork count for the file is incremented when the parent process which is mapped to at least one page associated with the file is used in a fork operation.

13. The method of claim 8, wherein the child process is created using a fork operation.

14. A computer usable storage medium having computer readable program code embodied therein, when executed by a processor, to implement a method, the method comprising:
  receiving a first request to copy a first parent process, wherein the first parent process is associated with a first virtual memory address space, wherein the first virtual memory address space comprises a first mapping to a first page of a file loaded into physical memory and, wherein the first page is associated with a reference count and a copy-on-write (COW) count;
  creating a first child process during a first fork operation performed using the first parent process, wherein the first child process is associated with a second virtual memory address space, wherein the second virtual memory address space includes a second mapping to the first page;

incrementing a first fork count associated with the file in response to the first fork operation; and incrementing the reference count associated with the first page in response to the first fork operation.

15. The computer usable storage medium of claim 14, further having computer readable program code embodied therein, when executed by the processor, to implement the method, the method further comprising:

receiving a second request to copy the first parent process;

creating a second child process during a second fork operation performed using the first parent process, wherein the second child process is associated with a third virtual memory address space, wherein the third virtual memory address space includes a third mapping to the first page;

incrementing the first fork count associated with the file in response to the second fork operation; and incrementing the reference count associated with the first page in response to the second fork operation.

16. The computer usable storage medium of claim 15, further having computer readable program code embodied therein, when executed by the processor, to implement the method, the method further comprising:

receiving a request from the second child process to modify the first page;

creating a copy of the first page in response to the request from the second child process, wherein the copy of the first page is stored in the physical memory and the third virtual memory address space includes a fourth mapping to the copy of the first page;

removing the third mapping from the third virtual address space;

decrementing the reference count associated with the first page in response to creating the copy of the first page;

incrementing a reference count associated with the copy of the first page; and incrementing the copy-on-write (COW) count associated with the first page.

17. The computer usable storage medium of claim 16, further having computer readable program code embodied therein, when executed by the processor, to implement the method, the method further comprising:

receiving a third request to copy the first parent process;

creating a third child process during a third fork operation performed using the first parent process, wherein the third child process is associated with a fourth virtual memory address space;

incrementing the first fork count associated with the file in response to the third fork operation;

determining that a value of the first fork count is greater than a defined fork count threshold;

calculating a ratio of a value of the COW count to the value of the first fork count;

determining that the ratio is greater than a threshold ratio associated with the first page;

creating a second copy of the first page in physical memory; and creating a fifth mapping from the fourth virtual memory address space of the third child process to the second copy of the first page.

18. The computer usable storage medium of claim 17, wherein the third child process has read-write access to the second copy of the first page.

19. The computer usable storage medium of claim 17, wherein access to the first page is read-only.

20. The computer usable storage medium of claim 14, further having computer readable program code embodied therein, when executed by the processor, to implement the method, the method further comprising:

receiving, after creating a second copy of the first page, a fourth request to copy the first parent process; and creating a fourth child process during a fourth fork operation performed using the first parent process, wherein the fourth child process is associated with a fifth virtual memory address space; and creating a third copy of the first page in physical memory; and creating a sixth mapping from the fifth virtual memory address space of the fourth child process to the third copy of the first page.

* * * * *